United States Patent [19]

Hartley et al.

[11] Patent Number: 5,500,113

[45] Date of Patent: Mar. 19, 1996

[54] REVERSE OSMOSIS WATER SYSTEM

[75] Inventors: E. Dale Hartley, Malibu; F. Scott Hartley, Camarillo, both of Calif.

[73] Assignee: Shurflo Pump Manufacturing Co., Santa Ana, Calif.

[21] Appl. No.: 135,690

[22] Filed: Oct. 13, 1993

[51] Int. Cl.$^6$ ................................................. B01D 63/00
[52] U.S. Cl. .................... 210/321.6; 210/321.69; 210/321.72; 210/134; 210/136; 210/416.1; 417/401; 417/402; 417/403
[58] Field of Search .................. 210/321.6, 134, 210/136, 321.69, 321.72, 321.87, 416.1, 416.3; 417/402, 403, 401

[56] References Cited

U.S. PATENT DOCUMENTS

| | | |
|---|---|---|
| 2,500,624 | 3/1950 | Bailey . |
| 3,737,254 | 6/1973 | Swatty . |
| 3,825,122 | 7/1974 | Taylor . |
| 3,937,241 | 2/1976 | Cloup . |
| 3,988,967 | 11/1976 | Orzel . |
| 4,124,488 | 11/1978 | Wilson ................................ 210/134 |
| 4,187,173 | 2/1980 | Keefer . |
| 4,288,326 | 9/1981 | Keefer . |
| 4,348,161 | 9/1982 | Shibata . |
| 4,367,140 | 1/1983 | Wilson . |
| 4,410,301 | 10/1983 | Westmoreland . |
| 4,410,429 | 10/1983 | Harvey et al. . |
| 4,432,876 | 2/1984 | Keefer . |
| 4,498,982 | 2/1985 | Skinner . |
| 4,534,713 | 8/1985 | Wammer ............................ 210/416.3 |
| 4,610,192 | 9/1986 | Hartley et al. . |
| 4,632,754 | 12/1986 | Wood . |
| 4,645,599 | 2/1987 | Fredkin . |
| 4,684,332 | 8/1987 | Hartley et al. . |
| 4,827,831 | 5/1989 | Hartley et al. . |
| 4,827,832 | 5/1989 | Hartley et al. . |
| 4,832,071 | 5/1989 | Rehfeld . |
| 4,836,924 | 6/1989 | Solomon ........................... 210/321.87 |
| 4,924,671 | 5/1990 | Reinert . |
| 4,995,793 | 2/1991 | Solomon . |
| 5,000,845 | 3/1991 | Solomon . |
| 5,009,777 | 4/1991 | Solomon ............................ 210/257.2 |
| 5,244,361 | 9/1993 | Solomon ............................... 210/134 |

FOREIGN PATENT DOCUMENTS

| | | |
|---|---|---|
| 1176572 | 10/1984 | Canada . |
| 0028913 | 11/1980 | European Pat. Off. . |
| 3101694 | 8/1982 | Germany . |
| 2088968 | 10/1980 | United Kingdom . |

Primary Examiner—Ana M. Fortuna

[57] ABSTRACT

A reverse osmosis system includes a reverse osmosis module with a reverse osmosis membrane and having an inlet port coupled to a source of feed water under predetermined pressure via a feed water inlet conduit, a product water outlet port for filtered outlet product water, and a flush water inlet port. A reciprocating pump is coupled into the feed water inlet conduit between the source of feed water and the inlet port of the module and is driven during both the pumping and return strokes solely by the feed water under pressure. A spool valve controls the flow of feed water to and from the pump during the pumping and return strokes and also controls the flow of feed water and flush water to the module, as well as brine from the module. During the pumping stroke, a check valve in a flush water inlet conduit between the spool valve and the flush water inlet port prevents brine from exiting the module. Then, during the return stroke, flush water is supplied from the pump to the module through the flush water inlet conduit, to flush substantially all of the brine from the module.

22 Claims, 4 Drawing Sheets

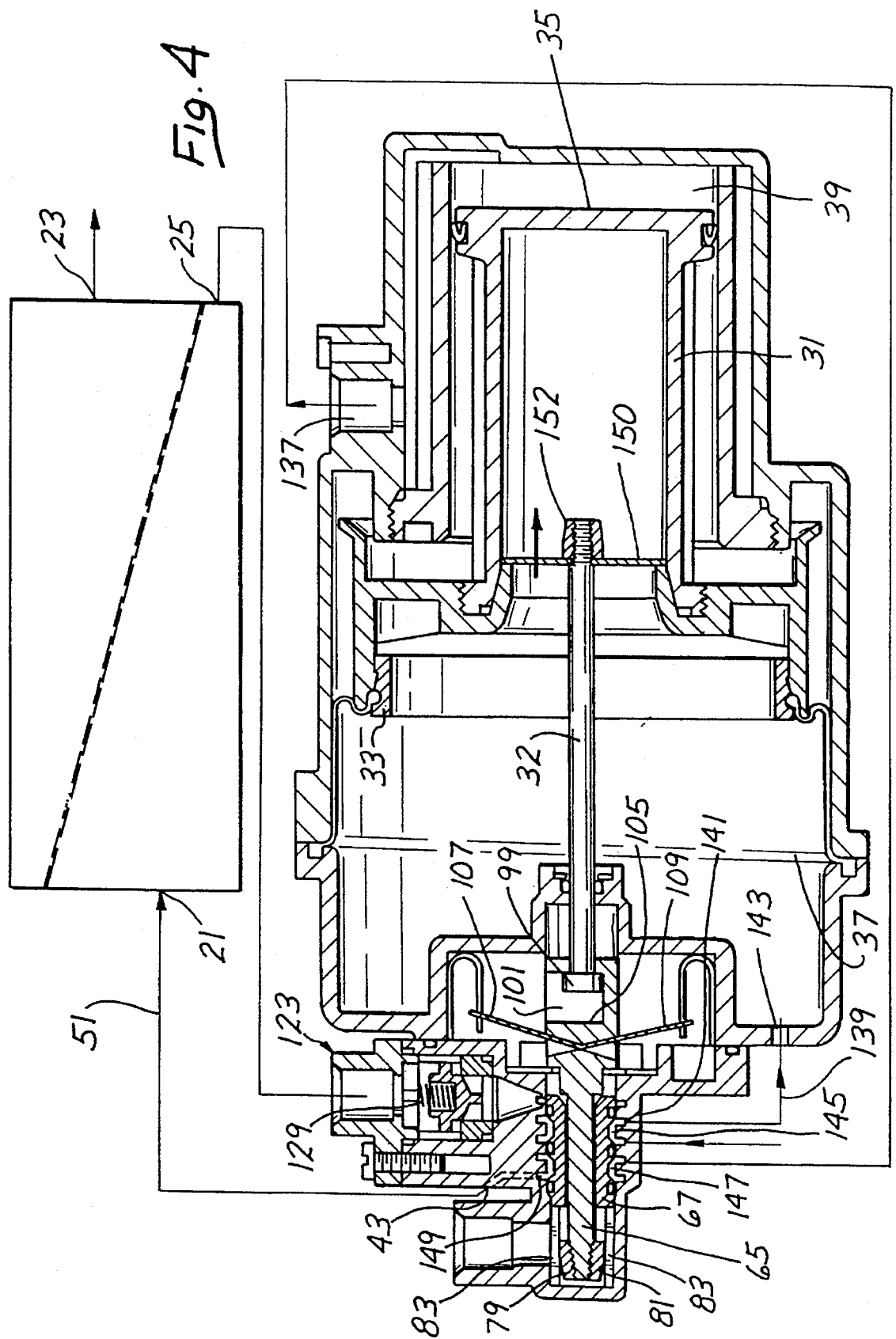

REVERSE OSMOSIS WATER SYSTEM

BACKGROUND OF THE INVENTION

This invention relates to a system for the purification of water by reverse osmosis.

Reverse osmosis systems are commonly used for removing impurities from water, such as drinking water. A conventional reverse osmosis system includes a reverse osmosis module or filter having a reverse osmosis membrane. Feed water is supplied to the module, and the module delivers filtered product water having a reduced impurity content. Not all of the feed water supplied to the module passes through the reverse osmosis membrane, and this unfiltered water, or brine, is commonly discharged to drain or recycled through the filter or for some other use.

A number of prior art solutions for draining the brine from the reverse osmosis module have been employed. One such solution is to provide a brine drain port on the brine side of the module membrane, with a restrictor to ensure that the feed water permeates the membrane rather than flowing directly through the brine drain port. However, the problem with this solution is that the restrictor frequently becomes clogged, resulting in a build-up of brine in the module and the eventual inoperability of the reverse osmosis system.

Another prior art solution is to provide an unrestricted brine drain port on the brine side of the module membrane, but to include a tap valve thereon, again to ensure that the feed water permeates the membrane rather than simply flowing through the unrestricted brine drain port. Under ordinary circumstances, the tap is closed and product water is produced in the conventional manner, with the brine building up within the module on the brine side of the membrane. However, periodically the tap will be opened to supply unfiltered water for an appropriate purpose, such as laundry, irrigation, a hot water heater, a dishwasher, or the like. Opening the unrestricted tap suspends the creation of purified water, and diverts all of the incoming feed water through the tap, resulting in a high velocity flushing of the brine side of the module. This type of system can work very well, but is subject to uncertainty because of its dependence on the periodic opening of the tap. If the tap isn't opened for a substantial period of time, the system will become clogged with brine and cease operation.

To increase the volume of product water, it is known to employ a pump to increase the pressure of the feed water supplied to the reverse osmosis module. A conventional electric motor driven pump may be used for this purpose. It is also known to employ a reciprocating pump which is driven solely by the feed water, which, for example may be supplied from a city water system and have a pressure of approximately 40–70 psi. In these prior art systems, the piston is typically driven through its pumping stroke by feed water at supply pressure. Then, the piston is driven through its return stroke by a biasing spring in combination with brine from the reverse osmosis module, which has been drained from the module through an unrestricted port and is delivered by a fluid conduit into a return chamber of the pump. The brine drain port is controlled by a valve which is actuated in accordance with the position of the piston, so that product water is produced during the pumping stroke of the piston, with the brine drain valve in the closed position, and brine is drained into the return chamber of the pump during the return stroke, with the brine drain valve open, to assist in returning the piston.

SUMMARY OF THE INVENTION

This invention provides a reverse osmosis system which has many desirable features and operates simply and reliably. With this invention, the reset spring of the prior art may be eliminated. In addition, a thorough flushing of the reverse osmosis membrane is achieved.

The system comprises a module which includes a reverse osmosis membrane, an inlet port connectable to a source of feed water, which may be a city water supply or the like, which supplies water at a predetermined pressure via a feed water inlet conduit, and a filtered product water outlet port. A reciprocating pump having a reciprocable member which reciprocates through pumping and return strokes, for boosting the pressure of the feed water for supply to the reverse osmosis module, is coupled into the feed water inlet conduit. The reciprocable member has first and second faces which are both exposable to the feed water at the supply pressure. A valving system forms an integral part of the reverse osmosis system, and has first and second states for controlling the supply and exhaust of feed water to and from each of the two reciprocable member faces, as well as controlling the flow of feed water to the reverse osmosis module and the flow of brine therefrom. The reciprocable member actuates the valving system from one state to the other as it approaches the end of each of its pumping and return strokes.

In operation, during the pump's pumping stroke, feed water is injected from the pump into the reverse osmosis module, then passes through the membrane, producing product water thereby. The brine at this time remains in the module.

An important feature of the invention is that during the return stroke, water is injected from the pump at a relatively high velocity into the reverse osmosis module. This water does not permeate the membrane because of its high velocity and relatively low pressure, and therefore acts to effectively flush the membrane of brine accumulated during the pumping stroke.

In one important aspect of the invention, the reciprocable member of the boost pump is driven during both the pumping stroke and the return stroke solely by feed water delivered at the predetermined supply pressure. This eliminates the need for the reset spring. Preferably, the reciprocable member of the pump is a differential piston, having a small area face and a large area face. During the pumping stroke, the valving system is in a first position from which it delivers the supply feed water to a first pumping chamber adjacent to the large area face of the piston. This drives the piston in a direction such that water exits from a second pumping chamber adjacent to the small area face of the piston, at a pressure significantly above the supply pressure, and supplies the module for the production of product water. Then, at the end of the pumping stroke, the piston actuates the valving system to its second state or position, thereby causing it to deliver the supply feed water, at the same supply pressure, to the second pumping chamber. This influx of water reverses the direction of the piston and causes it to begin its return stroke.

One advantage of the differential area piston is that it operates on the return stroke to create a high speed flush of the reverse osmosis membrane. More specifically the large area face of the piston sweeps through the large first pumping chamber to provide a large volume of water at a high velocity which thoroughly flushes and cleans the membrane.

In another aspect of the invention, the valving system preferably comprises a hydraulically balanced multi-port spool valve, which not only controls the flow of feed water to and from the two faces of the pump's reciprocable member, but also controls the flow of feed water and flush water to the reverse osmosis module, as well as the flow of brine from the module. This construction results in a simple system requiring only a single valve. The spool valve is movable between first and second positions for controlling the supply and exhaust of the feed water under supply pressure to and from the two reciprocable member faces. A bistable spring device having first and second states and a neutral position between the states thereof preferably actuates the valve between its two positions. A mechanism drivingly couples the reciprocable member and the bistable spring device so that the reciprocable member can move the bistable spring device from one of its states through the neutral position, with the resilience of the bistable spring device at least assisting in moving the bistable spring device from its neutral position to the other state. The bistable spring device is coupled to the valve so that movement of the spring device to the other state thereof at least assists in driving the valve from one of its positions to the other one.

Preferably, the system includes a mechanical backup feature involving direct linear actuation by the reciprocable member shaft in case the bistable spring device fails initially to actuate the valving system between its two states, resulting in an extremely reliable filtration system.

In yet another aspect of the invention, the reverse osmosis module includes a feed water inlet port, a flush water inlet port, and a product water outlet port. A flush water inlet conduit couples the valving system and the flush water inlet port. A check valve is coupled to the flush water inlet conduit, and is biased to prevent brine from exiting through the flush water inlet port during the pumping stroke. Thus, the brine remains in the module until the return stroke, at which time flush water from the pumping chamber adjacent to the large area face of the differential piston flows from the valving system through the check valve and flush water inlet conduit, and enters the module via the flush water inlet port. This flush water, at a relatively high velocity, effectively flushes substantially all of the residual brine from the membrane and module through the module feed water inlet port, to drain.

The invention, together with additional features and advantages thereof, may best be understood by reference to the following description taken in connection with the accompanying illustrative drawing.

BRIEF DESCRIPTION OF THE DRAWING

FIG. 4 is a schematic view similar to FIG. 2, showing the piston nearing the end of its pumping stroke.

DESCRIPTION OF THE PREFERRED EMBODIMENT

Figure 1:
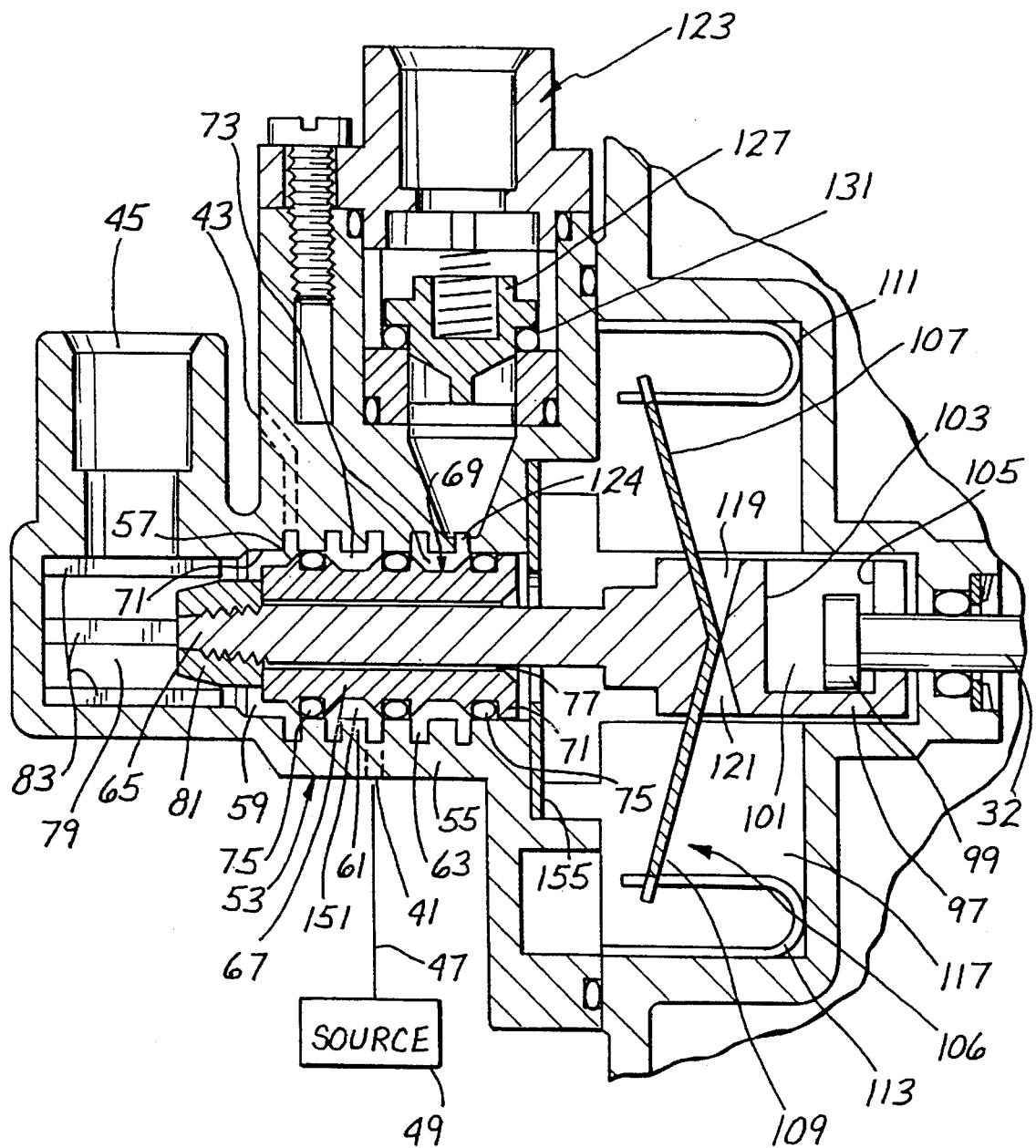
FIG. 1 is an enlarged fragmentary sectional view through a reciprocable pump forming a part of a reverse osmosis system constructed in accordance with the teachings of this invention, showing details of a preferred valve system and bistable spring device. The pump is shown with the piston beginning its return stroke.

The drawing shows a reverse osmosis water system 11 (FIG. 2) which comprises a reverse osmosis module 13 and a pump 15. The reverse osmosis module 13 is conventional and includes a reverse osmosis filter or membrane 17 within a housing 19. The housing 19 has an inlet port 21, a product water outlet port 23, and a flush water inlet port or flush port 25.

The pump 15 includes a housing 27 which defines a chamber 29 in which a reciprocable member or piston 31 is slidably mounted for reciprocating movement and a piston shaft 32. The piston 31 is a differential area piston, having a relatively large area face 33 and a smaller area face 35, and divides the pump chamber 29 into an inlet chamber 37, exposed to the larger area face 33, and an outlet chamber 39, exposed to the smaller area face 35. In a preferred embodiment, the area ratio between the larger area face 33 and the smaller area face 35 is approximately 3:1, though it may vary according to the desired function of the reverse osmosis system and the initial feed water pressure from the source of supply.

The pump housing 27 further includes a feed water inlet port 41 (FIGS. 1 and 2), a feed water outlet port 43, and a brine outlet port 45, all of which are shown schematically. The port 43 also serves as a brine inlet port, as will be described more fully hereinbelow. The inlet port 41 is coupled by a conduit 47 to a source 49 (FIG. 1), such as a pump and/or a city water supply, of feed water under pressure, and the outlet port 43 is coupled by a conduit 51 to the inlet port 21 of the module 13. Together, the conduits 47 and 51 constitute an inlet conduit which extends between the source 49 of feed water and the inlet port 21 of the module.

A spool valve 53 (FIG. 1) controls the supply of feed water under pressure from the source 49 to the pump chambers 37 and 39, so that the feed water may serve as the driving fluid to drive the piston 31 in a reciprocating manner. The spool valve 53 also serves to control the exhausting of the chambers 37 and 39 to the module 13, to permit the functioning of the reverse osmosis system, as will be described in detail hereinbelow. The spool valve 53 comprises a valve housing 55 having an inner wall surface 57 which defines a generally cylindrical valve chamber 59. The inner wall surface 57 of the valve housing 55 is comprised of a series of alternating annular lands 61 and annular undercuts or grooves 63. Slidably mounted axially about a rod 65 within the valve chamber 59 is a spool valve body 67 which has an exterior surface 69 formed of an alternating series of annular lands 71 and grooves 73. Retained in channels on the valve body lands 71 are a plurality of o-rings 75, which are oriented so that when the valve body 67 is stopped in a position wherein the valve housing lands 61 and the valve housing lands 71 are aligned, each land 61 is in sealing engagement with a respective o-ring 75. The rod 65 and the valve body 67 are spaced by an annular gap 77, so that the rod 65 may move axially independently of the valve body 67. The rod 65 extends leftwardly out of the valve chamber 59 into a brine outlet plenum 79. On the leftmost end of the rod 65 is threadedly mounted a bumper nut 81 which is guided axially within the plenum 79 by a plurality of stop ribs 83 mounted longitudinally on the surface defining the plenum 79.

The spool valve rod 65 also extends rightwardly out of the valve chamber 59 through an opening 85 (FIG. 2) in an end cap 87 which forms a portion of the housing 27 and which encloses the leftmost end of the pump chamber 29 by means of a rolling diaphragm 89. This rod extension portion 91 includes a pair of stepped diameter increases 93 and 95 culminating in a large diameter coupling portion 97. The coupling portion 97 of the rod extension portion 91 is attached to the leftmost end or attachment portion 99 of the piston shaft 32, in such a manner as to ensure that there is lost motion between the two elements. In the preferred embodiment, the attachment portion 99 of the shaft 32 has a greater diameter than the remainder of the shaft and is received within a lost motion chamber 101 (FIG. 1) in the coupling portion 97 of the rod 65. When the piston 31 is reciprocated in one of its two directions, the attachment portion 99 of the shaft 32 moves axially within the chamber 101 until it contacts one of two chamber walls 103 and 105, after which, by virtue of the contact between the coupling portion 97 and the attachment portion 99, the coupling portion 97 is either pushed or pulled to reciprocate in response to the reciprocation of the piston 31.

In the preferred embodiment, the pump 15 includes a bistable spring device 106, comprising identical rigid levers 107 and 109, which may be constructed of stainless steel, and identical U-shaped springs 111 and 113 which are mounted within respective chambers 115 and 117. The levers 107 and 109 have tabs (not shown) on the outer ends thereof, which are received by openings in the U-shaped springs 111 and 113, thereby attaching the levers 107 and 109 to the springs 111 and 113 so that the levers are biased towards the coupling portion 97. Such an attachment scheme is shown and disclosed in U.S. Pat. No. 4,610,192, herein incorporated by reference. Of course, other well known prior art attachment methods may be utilized equally well without compromising the efficacy of the claimed invention. The springs 111 and 113 may be integrated into one spring, interconnected by a web such as that shown in the U.S. Pat. No. 4,610,192, or may be distinct spring elements, as shown. The coupling portion 97 has recesses 119 and 121 which progressively widen as they extend radially toward the periphery of the coupling portion 97, and this allows each of the levers to pivot about a pivot axis at the inner end of the associated recess. Because the levers 107 and 109 are biased toward the coupling portion 97, it forms pivot axes for the levers by virtue of the progressively widening nature of each of the recesses 119 and 121.

A check valve 123 is mounted atop the spool valve 53, in flow communication with a fluid port 124 thereof, and integral with the pump housing 27. A flow or flush conduit 125 (FIG. 2) fluidly connects the check valve 123 with the flush water inlet port 25 of the module 13. The check valve 123 includes a poppet 127 which is biased by a spring 129 against a valve seat 131 so that no fluid may flow in a direction from the flush water inlet port 25 to the port 124 of the spool valve 53. A conduit 133 (FIGS. 2 and 4) couples another port 135 of the spool valve 53 with a port 137 of the pump outlet chamber 39. A conduit 139 couples yet another port 141 with a port 143 of the pump inlet chamber 37.

Now with reference to the operation of the device, the water system 11 is first primed in a conventional manner to ensure that all of the tubes and the chambers of the injector pump 15 are fully charged with water. In the position shown in FIG. 4 the reverse osmosis system is in its product water production cycle. Water under pressure is supplied from the supply source 49 through the conduit 47 and into the spool valve inlet port 41. With the spool valve body 67 in a first leftmost position, the feed water flows through an annular chamber portion 145 of the spool valve 53 and exits through port 141 into conduit 139. The feed water flows through port 143 into the pump inlet chamber 37. The influx of pressurized feed water into the chamber 37 acts against the large area face 33 to drive the piston 31 to the right, thereby causing the smaller area face 35 to act against the water in the outlet pumping chamber 39, so that the pressurized feed water exits the chamber 39 through port 137. Because of the differential area piston, this water flowing through conduit 133 is boosted to a significantly higher pressure than the inlet feed water pressure in the chamber 37. With the spool valve body 67 still in its first position, the water flows from conduit 133 into a spool valve annular chamber portion 147, then exits from a spool valve port 149 and the pump outlet port 43 into the conduit 51. From the conduit 51, the pressurized feed water enters the reverse osmosis module 13 by means of inlet port 21.

The feed water in the module 13 is at a sufficient pressure to provide a differential pressure across the membrane 17 greater than the osmotic pressure. Consequently, reverse osmosis occurs with the membrane 17 removing impurities from the water supplied to the module 13 and the product water is delivered to the outlet port 23 as filtered product water. The impurities, or brine, filtered out by the membrane remain in the module 13, being unable to exit through the conduit 125 because of the check valve 123. The piston 31 moves on the pumping stroke to provide make up feed water at the same rate that product water is discharged at the outlet port 23.

In the position of FIG. 4, the valve body 67 is retained in place by both the spring device 106 and friction which develops between the o-rings 75 and their corresponding lands 61, with its left end engaging the ribs 83. As the piston 31 moves on the pumping stroke the shaft 32 slides in an apertured plate 150 (FIG. 4) until an enlarged head 152 of the shaft contacts the plate. Further movement of the piston 31 to the right on the pumping stroke pulls the shaft to the right and as the piston nears the end of the pumping stroke the attachment portion 99 of the pump shaft 32 impacts the end wall 105 of the coupling portion chamber 101. This impact pulls the coupling portion 97 to the right, thereby pulling the spool valve rod 65 to the right.

Figure 5:
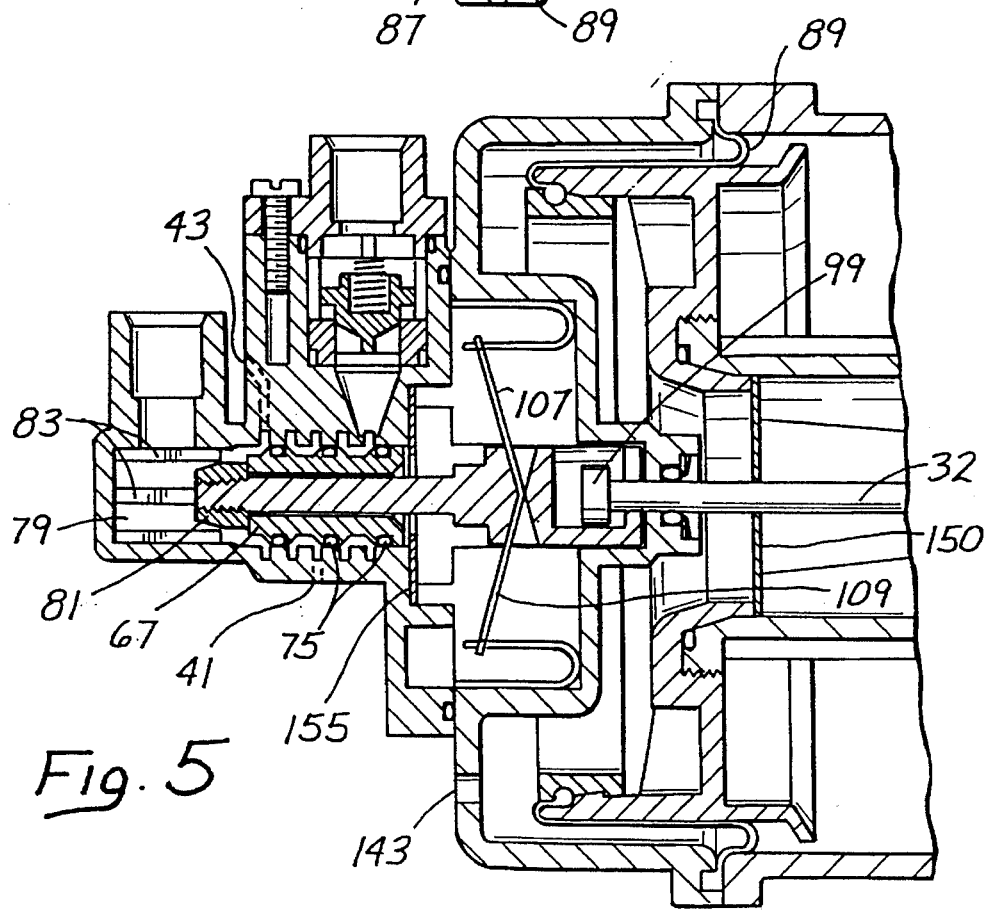
FIG. 5 is an enlarged fragmentary sectional view similar to FIG. 1, showing the pump with the beginning its return stroke.

Movement of the coupling portion 97 pivots the levers 107 and 109 through their neutral position and over center with the resilience of the springs 111 and 113 rapidly forcing the levers farther over center and into their second position, pivoted to the right as shown in FIG. 5. This rapid movement of the levers 107 and 109, which becomes stronger as the levers travel farther past the over center point, pushes the coupling portion 97 and the associated rod 65 equally rapidly to the right, thereby initiating movement of the spool valve body 67 to its second axial position by virtue of the force applied by the bumper 81 upon the spool valve body 67. In this position the right end of the spool valve body 67 may engage a stop plate 155 and is retained in this position by the spring device 106 and friction. Essentially, the brine outlet plenum 79 acts as another lost motion device, ensuring in conjunction with the lost motion chamber 101 that the spool valve 53 is Not actuated to its alternate position until the piston 31 has traveled a desired distance to the right.

An important aspect of the invention is that the spring biased levers 107 and 109 are arranged to form an over center device, in order to provide the impetus necessary to move the spool valve 53 from one to another of its two positions, rather than the direct action of the piston 31. However, on occasion, there may be a need for a mechanical backup to ensure the proper operation of the over center device. If for any reason, such as a valve jam or the like, the over center spring device 106 initially fails to move the spool valve to the other position, an advantage of the instant invention over the prior art is that the piston itself provides a backup means for ensuring that the bistable spring device 106 is able to switch the valve to its alternate position. Referring again to FIGS. 4 and 5, should the spring device 106, moving from its neutral position to its over center position as disclosed above, fail to initiate movement of the valve 53 from its first to its second position, the piston 31 will continue to move toward the right, with the attachment portion 99 of the piston shaft 32 pulling the coupling portion 97 and the associated spool valve rod 65 to the right as well. Once the bumper 81 impacts the left side of the valve body 67, the valve body will be forced to slide rightward axially, allowing it to pass the sealing land 61, into the frictionless undercut area, or switching zone, 63. This allows the stored energy of the bistable spring 106 to accelerate the valve body 67 in a frictionless environment towards the other sealing position. Once the valve 53 has been switched, the pressurized feed water flowpath changes and the piston 31 reverses direction, as is described more fully below.

Figure 2:
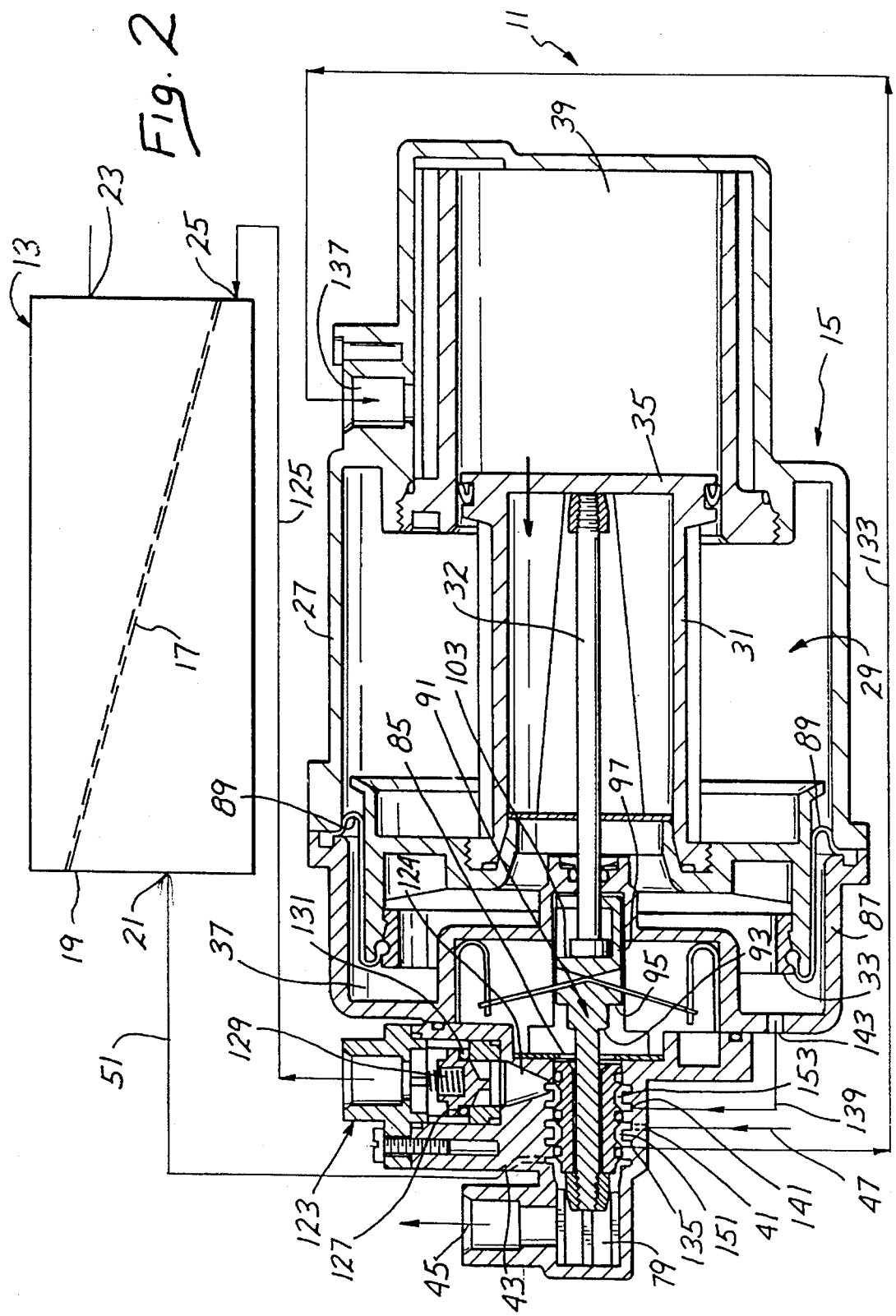
FIG. 2 is a schematic view partly in section illustrating a reverse osmosis system and a preferred embodiment of pump, which is driven by feed water under pressure. The piston is shown during the return stroke, moving toward the left.
Figure 3:
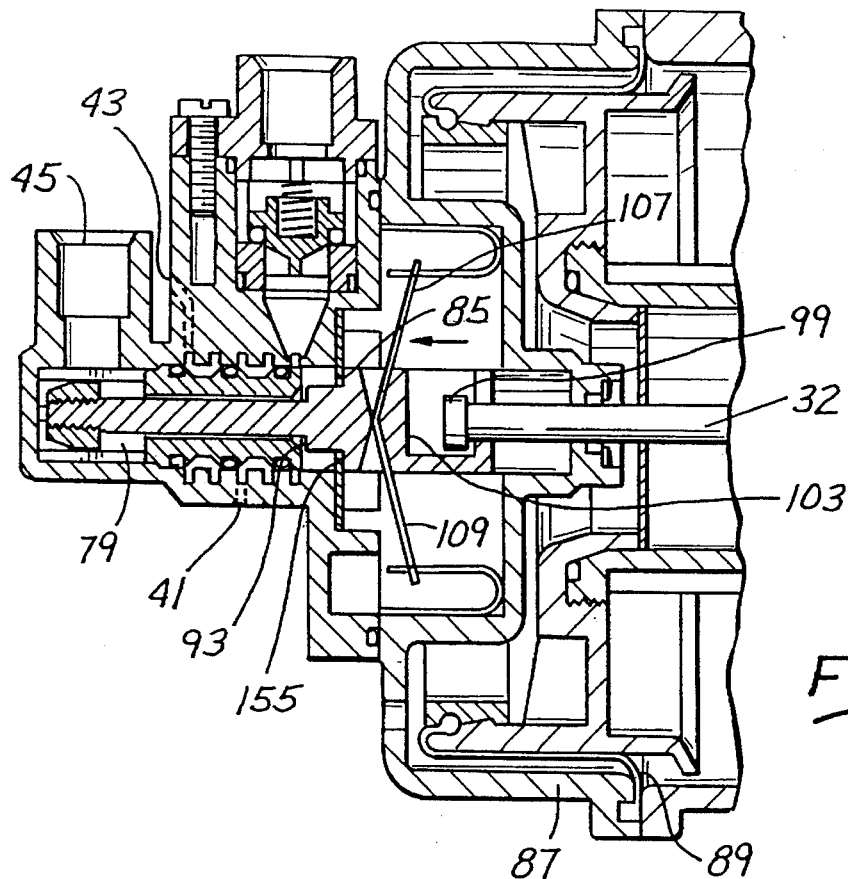
FIG. 3 is an enlarged fragmentary sectional view similar to FIG. 1, showing the pump with the piston beginning the pumping stroke.

The movement of the valve body 67 from its first position, shown in FIGS. 3 and 4, to its second position, shown in FIGS. 5, 1, and 2, constitutes a movement of each of the valve body lands 71 a total axial distance equal to the distance between the valve chamber lands 61, so that each o-ring 75 aligns in sealing engagement with the land 61 adjacent to the land 61 with which it was previously aligned. Referring now to FIGS. 5 and 1, which are essentially identical, FIG. 1 merely being an enlargement of FIG. 5, and illustrating the piston beginning its return stroke, and FIG. 2, which shows the piston 31 nearing the end of its return stroke, the pump is shown with the valve 53 in its second position. Consequently, because of the repositioned o-rings 75, the pressurized feed water from the supply line 47 enters into a different annular chamber portion 151 (FIG. 2) and from there flows to the outlet pumping chamber 39 via the conduit 133. The conduit 139 into the first pump chamber 37 is now cut off from the feed water supply line 47 by an intervening o-ring 75. The influx of pressurized feed water into the outlet pumping chamber 39 from conduit 133 through port 137 reverses the travel direction of the piston, driving it to the left, thereby causing pressurized feed water to exit the inlet pumping chamber 37 through the port 143 into conduit 139. With regard to the bistable spring device 105, the movement of the piston 31 back to the left on the return stroke causes the wall on which the piston face 35 is formed to engage the right end of the piston shaft 32 and push the shaft to the left. This moves the attachment portion 99 of the piston shaft 32 to the left through the chamber 101, until it impacts the end wall 103 of the coupling portion 97. This impact pushes the coupling portion 97 to the left, thereby pivoting the levers 107 and 109 toward over center to push the spool valve rod 65 to the left as shown in FIG. 3 to reverse the piston travel. If for any reason, such as a valve jam or the like, the piston does not reverse, the piston will directly drive the stepped portion 93 through the opening 85 and against the rightmost side of the valve body 67. Once the stepped portion 95 impacts the right side of the valve body 67, the valve body will be forced to slide leftward axially, thereby pushing the valve body 67 toward the frictionless undercut, or switching zone 63. This allows the stored energy of the bistable spring 106 to accelerate the valve body 67 in a frictionless environment towards the other sealing position. Once the valve 53 has been switched, the pressurized feed water flowpath changes. Consequently, the piston 31 again reverses direction and a new cycle begins.

The return stroke of the piston 31 coincides with the flush cycle for the reverse osmosis system 13. As noted above, during the return stroke, feed water exits the inlet pumping chamber 37 via conduit 139, entering a spool valve annular chamber portion 153 through the port 141. From the chamber portion 153 the water enters the check valve 123, and is sufficiently pressurized to overcome the bias of the spring 129, thereby lifting the poppet 127 off the valve seat 131. The open check valve 123 thus permits flow of the feed water from the pumping chamber 37 into the module 13 through the conduit 125 and the port 25.

Because the flush water entering the module through port 25 originates from the chamber 37 and is pressurized by the larger area piston face 33 during the relatively rapid return stroke, it is at a substantially lower pressure than the water in chamber 39, which is at the supply pressure (40 to 70 p.s.i. in a typical city water system). Because of the differential areas of the piston faces 33 and 35, the velocity of the flush water is relatively high. It is the high velocity of the flush water which is important to the operation of the inventive reverse osmosis system. As the high velocity flush water flows rapidly along the membrane 17, the resultant low static pressure on the brine side of the membrane 17 causes the differential pressure across the membrane 17 to drop below the osmotic pressure. This is believed to allow normal osmosis to occur which tends to reverse flow across the membrane 17 and push the impurities trapped in the membrane into the flush flow. This high velocity flush flow thus collects substantially all of the brine resident in the brine side of the module, after which the impurity ladened flush water exits the module through the port 21 and flows through the conduit 51 into the port 43, the spool valve port 149, the plenum 79 and the brine outlet port 45 to drain. It should be noted that the flush water does not cross the membrane to the pure product water side of the module.

Another key aspect of this invention is the advantageous configuration of the spool valve 53 in that it is hydraulically balanced. In the prior art systems, which use poppet valves to switch the piston travel direction, the valves are biased by the fluid pressure in the system, requiring a larger bistable spring force to overcome the fluid pressure bias in order to switch the valves. Thus, for high pressure applications, a strong spring must be used to assure switching of the valves. This relatively high spring force holds the reciprocable member in either of two positions even when the device is not in use, and as a consequence, the seating surfaces of the valves tend to take an undesirable permanent set. However, in the inventive system, the spool valve 53 is designed to be held in either of its positions merely by virtue of the relatively small spring force created by the bistable spring, which holds the valve body 67 in position prior to initiation of valve switching. The friction developed by the sealing engagement between the o-rings 75 and their corresponding lands 61 also serves as a secondary means for holding the valve body in position. Thus, the bistable spring device 106 need only overcome this frictional force to initiate movement of the valve body 67 from one position to another, permitting the use of a less powerful spring than might otherwise be required in a typical fluid pressure biased valving arrangement.

An additional advantage of the present invention, further reducing the force and the duration of the force necessary to switch the valve, is the use of fully annular grooves or undercuts 63 to provide the inlet and outlet ports for the spool valve 53, rather than simple drilled bores that are typically used in the prior art. The advantage of the annular undercuts is that as the valve body 67 travels axially from one of its positions to the other one, each of the o-rings 75 moving from one land 61 to the next, the o-rings 75 encounter virtually no friction as they travel over the annular undercuts. Therefore, once a sufficient force has been applied to the valve body 67 to initiate motion thereof, overcoming the friction due to the sealing engagement between each of the o-rings 75 and their corresponding lands 61, the valve body will have sufficient momentum, from the acceleration caused by the release of energy from the bistable spring, to travel an axial distance equivalent to the axial distance between lands 61, and thus sufficient to move into its other position. The frictionless travel of the o-rings across the undercuts will not degrade that momentum.

Although an exemplary embodiment of the invention has been shown and described, many changes, modifications, and substitutions may be made by one having ordinary skill in the art without necessarily departing from the spirit and scope of this invention.

What is claimed is:

1. A reverse osmosis system, comprising:

a module including a reverse osmosis membrane and a plurality of ports, one of said ports being an inlet port connectable to a source of feed water under pressure via a feed water inlet conduit, another of said ports being a flush port operatively associated with the feed side of said reverse osmosis membrane, and another one of said ports comprising a filtered product water outlet port;

a pump coupled into a feed water inlet conduit and comprising a housing having a chamber therein, a reciprocable member having pumping and return strokes in the chamber and having first and second faces exposable to said feed water under pressure;

a valving system responsive to the reciprocable member for controlling the flow of the feed water under pressure to and from the first and second faces so the reciprocable member can be reciprocated in said chamber; and a flush water conduit between the valving system and the flush port whereby during the pumping stroke, feed water is injected from said pump into said reverse osmosis module through said inlet port to produce product water which exits the module through the product water outlet port and during the return stroke, flush water is delivered from said pump through the flush water conduit and the flush port into said reverse osmosis module, said flush water flushing the membrane and then exiting as brine through said inlet port.

2. A reverse osmosis system as recited in claim 1, wherein said valving system includes a spool valve.

3. A reverse osmosis system as recited in claim 1, and further comprising a check valve in said flush water conduit to prevent flow from said module to the valving system.

4. A reverse osmosis system as recited in claim 1, wherein said reciprocable member is a differential area reciprocable member with first and second faces comprising larger and smaller area faces, respectively, and during the pumping stroke the smaller area face acts on the feed water in said pump to inject it into said module through said feed water inlet conduit, thereby producing product water, and during the return stroke, the larger area face acts on the feed water in the pump to inject it into said module through the flush water conduit at a higher velocity and a lower pressure than the water injected during the pumping stroke, thereby serving to flush brine from said module.

5. A reverse osmosis system, comprising:

a module including a reverse osmosis membrane, an inlet port connectable to a source of feed water under pressure via a feed water inlet conduit, a filtered product water outlet port, and a flush port operatively associated with the feed side of said reverse osmosis membrane;

a pump coupled into a feed water inlet conduit between the source of feed water and the inlet port of the module and comprising a housing having a pumping chamber therein, a reciprocable member in the pumping chamber, said reciprocable member having pumping and return strokes and dividing the pumping chamber into an inlet chamber exposed to a first face of the reciprocable member and an outlet chamber exposed to a second face of the reciprocable member;

a valving system for controlling the flow of the feed water under pressure to and from the inlet and outlet chambers whereby the reciprocable member can be reciprocated in said chamber, and for further controlling the supply of feed water entering said reverse osmosis module through the feed water inlet conduit;

said feed water inlet conduit coupling the valving system and the module inlet port, a flush water conduit coupling the valving system and the flush port, and additional fluid passages coupling each of said pump inlet and outlet chambers and the valving system;

said valving system allowing flow from the pump to the module via the flush water conduit during the return stroke; and a check valve coupled to said flush water conduit between said valving system and the flush water inlet port to prevent flow from the module to the valving system and to allow flow from the valving system to the module.

6. A reverse osmosis system as recited in claim 5, wherein said reciprocable member is driven in each reciprocating direction solely by the feed water under pressure.

7. A reverse osmosis system as recited in claim 5, wherein said valving system comprises a spool valve.

8. A reverse osmosis system comprising:

a feed water inlet conduit coupled to a source of feed water under pressure;

a reverse osmosis module including a reverse osmosis membrane, an inlet port connectable to the feed water inlet conduit, a filtered product water outlet port, and a flush port for brine operatively associated with the feed side of said reverse osmosis membrane;

a flush conduit coupled to the flush port;

a valve coupled to the feed water inlet conduit and the flush conduit;

a pump in fluid communication with the valve and comprising a housing having a chamber therein, a reciprocable member having pumping and return strokes in the chamber and having first and second faces exposable to said feed water under pressure;

said valve controlling the flow of the feed water under pressure to and from the first and second faces whereby the reciprocable member can be reciprocated in said chamber and for controlling flow from the pump to the module through the feed water inlet conduit and the flush conduit; and the reciprocable member being driven in each reciprocating direction solely by the feed water under pressure.

9. A reverse osmosis system as defined in claim 8 including a check valve coupled into said flush conduit between said valve and the flush port to prevent flow from the module to the valve.

10. A reverse osmosis system as defined in claim 8 wherein said first face has a larger area than said second face, and during the pumping stroke the smaller area face of said piston acts on the feed water to inject it into said module through said feed water inlet conduit to produce product water, and during the return stroke the larger area face of said piston acts on the feed water to inject it through the flush conduit into said module at a higher velocity and a lower pressure than the water injected during the pumping stroke to thereby flush brine from said module.

11. A reverse osmosis system as recited in claim 8, wherein said valving system comprises a spool valve.

12. A reverse osmosis system as recited in claim 8, wherein the module has a flush port and during the pumping stroke, feed water is injected from said pump into said reverse osmosis module through said inlet port to produce product water which exits the module through the product water outlet port, and during the return stroke, flush water is injected from said pump into said reverse osmosis module through said flush port, said flush water flushing the membrane, and then exiting as brine through said inlet port.

13. A reverse osmosis system comprising:
- a feed water inlet conduit coupled to source of feed water under pressure;
- a reverse osmosis module including a reverse osmosis membrane, an inlet port connectable to the feed water inlet conduit, a filtered product water outlet port, and a flush port for brine operatively associated with the feed side of said reverse osmosis membrane;
- a flush conduit coupled to the flush port;
- a valve coupled to the feed water inlet conduit and the flush conduit;
- a pump in fluid communication with the valve and comprising a housing having a chamber therein, a reciprocable member having pumping and return strokes in the chamber and having first and second faces exposable to said feed water under pressure;
- said valve having a first position in which the valve directs feed water under pressure from the feed water inlet conduit to said first face of the reciprocable member to drive the reciprocable member on the pumping stroke and directs water pumped by said pump on the pumping stroke to the inlet port of the module via the feed water inlet conduit; and
- said valve having a second position in which the valve directs feed water under pressure from the feed water inlet conduit to said second face of the reciprocable member to drive the reciprocable member on the return stroke and directs water received from the pump on the return stroke to the flush port via the flush conduit.

14. A reverse osmosis system as defined in claim 13 including a check valve coupled into said flush conduit between said valve and the flush port to prevent flow from the module to the valve.

15. A reverse osmosis system as defined in claim 13 wherein said valve in said second position directs water received from the module via the feed water inlet conduit to drain.

16. A reverse osmosis system as defined in claim 15 wherein the reciprocable member is driven on both the pumping and return strokes solely by the feed water under pressure.

17. A reverse osmosis system as defined in claim 16 including a check valve coupled into said flush conduit between said valve and the flush port to prevent flow from the module to the valve.

18. A reverse osmosis system as defined in claim 13 wherein said valve is a spool valve.

19. A reverse osmosis system as defined in claim 18 including a bistable spring device having first and second states and a neutral position between the states thereof and a mechanism between the reciprocable member and the bistable spring device for drivingly coupling the reciprocable member and the bistable spring device so that said reciprocable member can move the bistable spring device from one of its states through the neutral position, with the resilience of the bistable spring device at least assisting in moving the bistable spring device from its neutral position to the other state thereof, said bistable spring device being coupled to said spool valve such that movement of said bistable spring device to said other state at least assists in driving said spool valve from one of said first and second positions to the other one thereof.

20. A reverse osmosis system as recited in claim 19, wherein said spool valve comprises:
- a valve housing having a valve chamber therein, said valve chamber being defined by an interior wall surface having a plurality of lands arranged thereon, and a plurality of undercut annular grooves being arranged in an alternating fashion between said valve chamber lands;
- a valve body slidably mounted within said valve chamber for movement between first and second positions, said valve body comprising a generally cylindrical exterior surface having a plurality of lands arranged thereon, said valve body lands being configured to include sealing surfaces which sealingly interface with corresponding valve chamber lands when said valve body is located in one of said first and second positions within said valve chamber;
- said spool valve being balanced without a substantial fluid pressure bias when in either of said first and second positions, and further comprising a rod which extends from said valve chamber in a direction toward said reciprocable member, said rod including a coupling portion being coupled to said bistable spring device so that said valve body may move in response to movement of said bistable spring device from one of said first and second states to the other one thereof.

21. A reverse osmosis system as recited in claim 20, wherein said bistable spring device further comprises first and second levers, inner end portions of which are received by first and second recesses in said coupling portion, respectively, and springs for urging the first and second levers into the first and second recesses, respectively, of the coupling portion.

22. A reverse osmosis system as recited in claim 20, wherein said reciprocable member has a shaft attached thereto which extends toward and interconnects with said coupling portion, whereby when said bistable spring device is unable to exert sufficient force to drive the spool valve from one of said first and second positions to the other one thereof, said reciprocable member will continue its movement in the same direction, thereby eventually initiating movement of the spool valve to its other position directly through the interconnection between the shaft and the coupling portion.

* * * * *